July 8, 1947.  H. W. GOULD  2,423,771
GASKET
Filed Sept. 17, 1945

INVENTOR.
Harold W. Gould
BY Charles P. Vogtech
atty.

Patented July 8, 1947

2,423,771

UNITED STATES PATENT OFFICE 2,423,771

GASKET

Harold W. Gould, Evanston, Ill., assignor to Crane Packing Company, Chicago, Ill., a corporation of Illinois Application September 17, 1945, Serial No. 616,700

3 Claims. (Cl. 288—2)

This invention relates to gaskets and particularly to gaskets for use in applications where no provision is made for adjustment of the pressure on the gasket after it is installed. For purposes of illustration, this invention will be described with reference to a gasket for effecting a seal between the cylinder body and cylinder head of a Diesel engine at the water jacket.

There are many materials available for use as gaskets which operate very well as long as expansion and contraction can be compensated for by mechanical means, or the pressure on the gasket remains constant. Such materials, however, lose their sealing ability should the pressure be relieved, for example, as a result of the expansion of the bolts or other means used to hold the parts of the device together. Such materials have not been found to work very well when installed as gaskets in the cooling water system of a Diesel engine. In order to compensate for the thermal expansion of the parts to be sealed, it has been proposed to use a resilient composition as the gasket material, this composition being preferably rubber or one of the synthetic rubbers. The rubber gasket has limitations as to temperature, however, which cause it to deteriorate rather rapidly. It is also well known that rubber, either natural or synthetic, when heated above 300° Fahrenheit will become hard and brittle and will lose its ability to follow the thermal expansion and contraction of the parts to be sealed.

The principal object of this invention is to provide a gasket for a device in which no provision is made for adjustment of the pressure on the gasket after it is installed, which gasket will provide an effective seal at all times under these conditions.

A more specific object of this invention is to provide a gasket which is made of a plurality of materials, the material forming the main body of the gasket being a plastic packing comprising a mixture of asbestos, graphite and rubber, and another being a mixture of cork, graphite and a polyisobutylene having a relatively high molecular weight with a loose jacket of woven cotton threads.

Yet another object of this invention is to provide a gasket for the use hereinabove described, said gasket being comprised of a main body of a plastic packing comprising asbestos, graphite and rubber, an outer protective ring of lead and a groove filled with a packing substance comprising essentially cork, graphite and a polyisobutylene.

Yet another object of this invention is a method of forming a ring for a gasket comprising a main body of relatively hard material, a protective metallic edge and a surface of tacky packing material.

These and other features and objects of this invention will become apparent from the following detailed description when taken together with the accompanying drawings, in which Fig. 1 is an elevation in section of a forming die for forming a ring or gasket in accordance with this invention, the die being shown in partially closed position;

Figure 1:
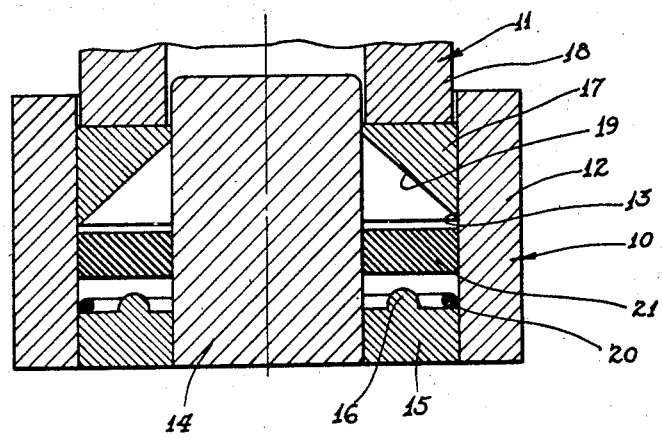

Referring now to Fig. 1 for a detailed description of this invention, there is shown a lower die member 10 and an upper die member 11 in a partially closed position. Said lower die member 10 is comprised of a block 12 having formed therein a circular opening 13. The diameter of opening 13 is substantially equal to the outside diameter of the finished gasket or ring. The internal diameter of the ring is determined by a pin 14 located centrally of opening 13. Between pin 14 and block 12 is a ring 15 having a bead 16 formed in the upper surface thereof. Said bead is located in such a manner that the apex thereof will be closer to pin 14 than to block 12. Ring 15 forms the under surface of the finished gasket. The upper die is comprised of a ring 17 secured to or removable with a hollow cylindrical upper die plunger 18. Said ring 17 is formed with an internal conical surface 19 which is utilized to form the exterior conical surface of the finished gasket.

Figure 2:
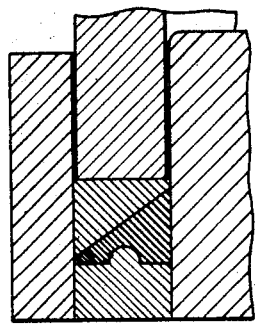
Fig. 2 is a quarter section corresponding to Fig. 1 showing the die in closed position.
Figure 3:
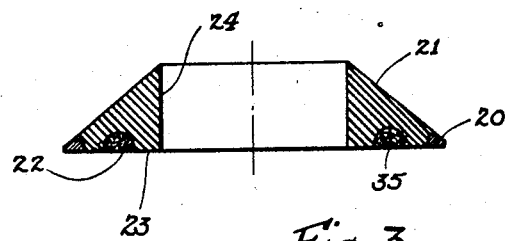
Fig. 3 is a section through a ring or gasket which has been completely formed and filled.

The function of the die is to form an endless ring from suitable material, one surface of the ring being conical, the other being substantially radial with a groove formed therein to receive a sealing material of a different character. The die also performs the function of uniting a protective endless ring of soft plastic metal to the outside tip of the finished ring. To this end when it is desired to form a ring with the dies shown in Fig. 1, an endless ring 20 of plastic metal such as lead is first dropped into the die to assume the position shown in Fig. 1. Next, an endless ring 21 of a plastic packing made preferably of asbestos fibres and rubber with metallic particles dispersed therein is dropped into the cavity between pin 14 and block 12. After endless ring 20 and ring 21 of the plastic material are in place in the cavity the upper die 11 descends to the position shown in Fig. 2. It will be observed that ring 21 is narrower than the finished height of the ring, the material at the outer edges of the ring being squeezed radially inwardly and upwardly to completely fill the space between lower ring 16 and upper ring 18 of the die. In the process of closing the dies, endless ring 20 of plastic metal will be deformed as shown in Fig. 2 and will become firmly embedded in the plastic material.

After the ring is formed in the dies, it is removed therefrom and it will be found to have a groove 22 in the surface 23 which is normal to the axis of the ring. Said groove 22 is unsymmetrical so that the apex thereof is located at a point closer to the center surface 24 of the ring than to the apex thereof. This will insure the presence of a proper amount of material above the apex to give the finished ring the necessary strength. The groove 22 is then filled with a ring of packing material comprising cork, graphite and a polyisobutylene of a relatively high molecular weight, enough of the material being imbedded into the groove so that it projects slightly from the surface 23.

Figure 4:
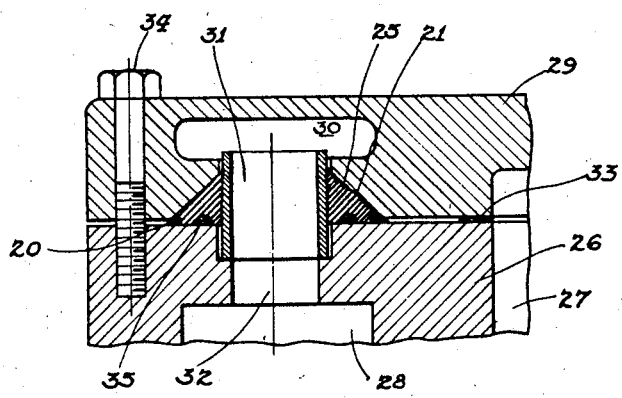
Fig. 4 shows the manner in which the ring of Fig. 3 may be applied to the cylinder head of a Diesel engine.

Referring now to Fig. 4, the finished gasket 25 is shown as it would appear when installed in the cylinder head of a Diesel engine. There is shown for example the body or block 26 of the engine having a cavity 27 which constitutes the combustion chamber and an adjacent cavity 28 which constitutes the cooling water jacket for the engine. The top of the combustion chamber 27 is covered by a cylinder head 29 which is cored as at 30 to form a cooling water chamber. The hollow chamber 30 is in communication with the chamber 28 by means of a metallic cylinder 31 which in turn is in communication with a passageway 32 leading directly into the top of chamber 28. Gasket 25 is inserted between the body 26 and head 29 around cylinder 31.

A considerable space is provided between the cylinder head 29 and the engine body 26 because of the presence of a soft metallic gasket 33 made of copper or similar metal near the internal combustion chamber 27. It will be observed that cylinder head 29 is retained on block 26 by means of a plurality of bolts 34 which are tightened initially and are not thereafter tightened except after the engine is serviced, as for example when the cylinder walls are cleaned or rebored. Thus when the pressure is applied by bolts 34 upon gasket 25 it may be relieved by subsequent expansion of the bolts and consequently were it not for the presence of a seal such as gasket 25 between the head and cylinder block, the coolant would soon escape from between the head and block to the exterior. With the ring 25 interposed between the head and body around cylinder 31, however, the escape of coolant is completely prevented regardless of the number of cycles of heating and cooling to which the engine may be put.

The function of the plastic body 21 of the ring is to take the general form of the cavity formed by the top of cylinder block 26 and cylinder head 29. The insert 35 is compressed with the plastic material 21 and if the pressure becomes too great the material of the insert has a tendency to escape around the top of cylinder block 26. The presence of ring 20 however prevents this and also protects the edge of the plastic and relatively soft material 21 from the destructive influences of the escaping substances of the insert. After the bolts 34 are tightened, the wedge action of the apex of the ring 25 is such that a considerable force is developed tending to hold ring 21 against the cylinder 31 and the cylinder head 29. This same force, however, is applied normal to the bottom surface of ring 25 and hence the unit loading on the bottom surface is less than the unit loading on the conical upper surface. Thus, should a separation take place between cylinder head 29 and cylinder block 26, the upper surface of ring 25 will tend to adhere to the cylinder head 29 and the flat surface 23 will tend to rise off the top of cylinder block 26. I have found from tests that the greatest tendency to leak occurs on this bottom surface rather than on the conical tapered surface. It is for this reason that a substance which is tacky, such as the material of insert 35 has been inserted into the groove 22. This tacky substance will maintain a seal between the cylinder head 29 and the cylinder block 26 even though a slight separation between the ring 25 and block 26 takes place.

It is understood that the foregoing description is merely illustrative of a preferred embodiment of this invention and that the scope of the invention therefore is not to be limited thereto but is to be determined by the appended claims.

What is claimed is:

1. A gasket comprising a ring having a body of plastic sealing material which has insufficient resilience to follow the expansion and contraction of the elements to be sealed, said body including asbestos, a flaky material and rubber, and means for effecting a seal despite such expansion and contraction, said means comprising an insert in the ring of soft tacky material which is capable of following the expansion and contraction of the elements to be sealed, said material including as its major constituents, cork and polyisobutylene.

2. A gasket comprising a ring having a body of plastic sealing material the principal ingredients of which are asbestos, graphite and rubber, said ring having a radially disposed side and tapered on the other side, with a groove formed in the radially disposed side, and a tacky substance retained within the groove, said substance including cork and polyisobutylene.

3. A gasket adapted to effect a seal between a cylindrical surface, a surface substantially normal to the cylindrical surface and a surface which is conical and connects the cylindrical and normal surfaces, said gasket comprising a body of plastic sealing material having substantially the configuration of the space defined by the said three surfaces, said plastic sealing material being comprised principally of asbestos, graphite and rubber, the surface on the gasket corresponding to the normal surface having a groove therein, and a tacky substance retained within the groove, said substance including cork and polyisobutylene and said substance contacting the normal surface.

HAROLD W. GOULD.

REFERENCES CITED

The following references are of record in the file of this patent:

UNITED STATES PATENTS

| Number | Name | Date |
| --- | --- | --- |
| 870,428 | Graham | Nov. 5, 1907 |
| 2,330,502 | Longman et al. | Sept. 28, 1943 |

FOREIGN PATENTS

| Number | Country | Date |
| --- | --- | --- |
| 189,688 | Great Britain | 1922 |